United States Patent [19]

Smith et al.

[11] Patent Number: 5,025,917
[45] Date of Patent: Jun. 25, 1991

[54] BEARING ASSEMBLY FOR CONVEYORS

[75] Inventors: Ian Smith; Carmin C. Simerly, both of Maryville; Jim E. Hilty, Knoxville; Mark S. Byerley, Greenback, all of Tenn.

[73] Assignee: WYKO, Inc., Greenback, Tenn.

[21] Appl. No.: 311,604

[22] Filed: Feb. 16, 1989

[51] Int. Cl.$^5$ ............................................. B65G 39/10
[52] U.S. Cl. .................................... 198/842; 384/480; 384/484; 277/57; 277/58
[58] Field of Search .......................... 193/37; 29/110; 384/144, 147, 480, 484; 277/53, 55, 56, 57, 58; 198/830, 824, 825, 842, 780

[56] References Cited

U.S. PATENT DOCUMENTS

| | | | |
|---|---|---|---|
| 2,825,439 | 3/1958 | Collis | 193/35 |
| 3,086,826 | 4/1963 | Gunnell | 308/37 |
| 3,610,387 | 10/1971 | Stein | 193/37 |
| 3,957,147 | 5/1976 | Specht | 193/37 |
| 4,199,052 | 4/1980 | Morris | 384/144 X |
| 4,272,135 | 6/1981 | Hamblin et al. | 308/20 |
| 4,277,114 | 7/1981 | Lindegger | 277/56 X |
| 4,315,566 | 2/1982 | Greener et al. | 193/37 |
| 4,339,158 | 7/1982 | Greener et al. | 308/20 |
| 4,373,759 | 2/1983 | Greener et al. | 308/187.2 |
| 4,458,957 | 7/1984 | Greener et al. | 308/187.1 |

FOREIGN PATENT DOCUMENTS

| | | | |
|---|---|---|---|
| 0066833 | 5/1969 | German Democratic Rep. | 198/842 |
| 1591194 | 6/1981 | United Kingdom | 198/842 |

Primary Examiner—D. Glenn Dayoan
Attorney, Agent, or Firm—Luedeka, Hodges, Neely & Graham

[57] ABSTRACT

A bearing assembly for rotatably supporting a conveyor roller tube for a belt conveyor or the like about a fixed shaft which includes a housing to which a roller tube is attached, an end cover positioned on the fixed shaft adjacent one side of the housing, and a bearing interposed between the housing and end cover permitting rotation of the housing relative to the end cover. The end cover completely covers the end of the shaft about which it is positioned and cooperates with the housing for effectively protecting the bearing from exposure to contaminants. During conveyor operation, the end cover prevents migration of contaminants along the shaft from the end thereof and the housing centrifugally expels contaminants which may enter the space between the housing and the end cover. In addition, the housing, bearing end cover, and shaft cooperate to limit axial shifting of the assembly components relative to one another.

10 Claims, 6 Drawing Sheets

BEARING ASSEMBLY FOR CONVEYORS

BACKGROUND OF THE INVENTION

This invention relates generally to a bearing assembly for conveyors, such as conveyor rollers and idlers, having a load-supporting roller tube positioned about a frame-supported stationary shaft and wherein a bearing assembly is interposed between the roller tube and shaft for relative rotation.

Conventional bearing assemblies for supporting a conveyor roller tube about a stationary shaft commonly include a housing having a periphery to which an end of the roller tube is attached, and a bearing being positioned between the shaft and the housing so as to permit rotation of the housing about the shaft. An end cover is positioned adjacent one side of the housing and is intended to protect components of the bearing from dirt, water or other undesirable contaminants which may come into contact with the bearing assembly.

Accordingly, it is an object of the present invention to provide an improved bearing assembly for a conveyor having an enhanced capacity for protecting its bearing from exposure to undesirable contaminants.

Another object of the present invention is to provide a bearing assembly of the class described having an end cover which prevents contaminants from entering the assembly along the shaft about which the assembly is positioned.

A further object of the present invention is to provide such a bearing assembly for limiting axial movement of the shaft about which the bearing assembly is positioned relative to the frame within which the shaft is supported.

Other objects and advantages of the invention will become known from the following description and drawings.

DETAILED DESCRIPTION OF THE ILLUSTRATED EMBODIMENTS

Figures 1, 2, 4:
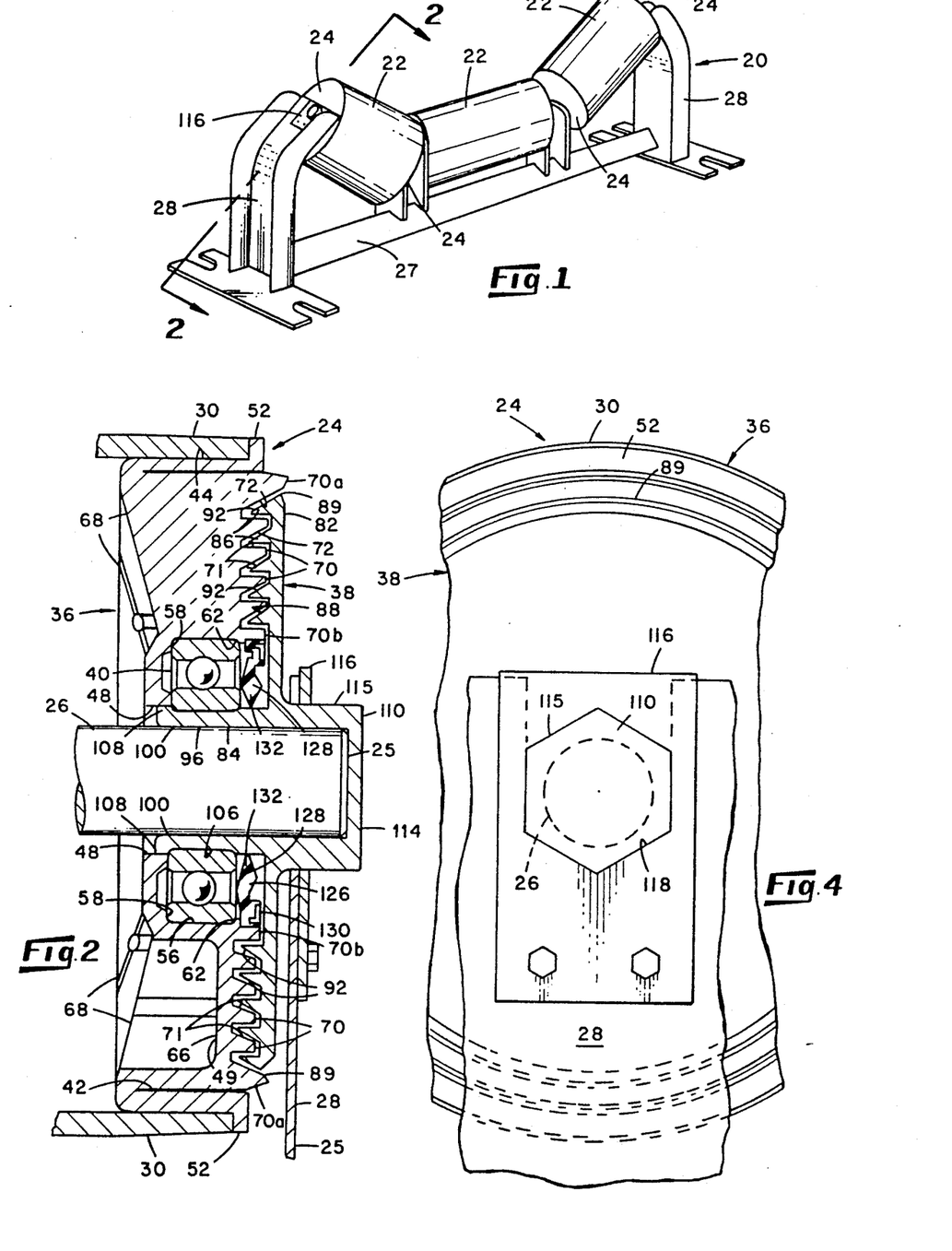
FIG. 1 is a perspective view of a typical conveyor belt support in which an embodiment of the present invention is incorporated.
FIG. 2 is a fragmentary cross-sectional view taken about on line 2—2 of FIG. 1.
FIG. 4 is an end elevational view of the FIGURE 2 assembly as seen generally from the right in FIG. 2.

Turning now to the drawings, and considering first FIGS. 1 and 2, there is shown a conveyor idler, generally indicated as 20, including three load-supporting rollers 22 within which bearing assemblies 24 in accordance with the present invention are positioned. Each roller 22 is rotatably mounted upon a fixed shaft 26 which is, in turn, supported upon a rigid frame 27. The frame 27 is positionable upon a support and includes upright support posts 28 for supporting each shaft 26 at its opposite ends. Each roller 22 further includes a hollow roller tube 30 arranged about a corresponding shaft 26 and extending the full length thereof. Two bearing assemblies 24 are positioned on the shaft 26 at the opposite ends thereof permitting rotation of the tube 30 relative to the shaft 26. The two bearing assemblies 24 positioned at opposite ends of the shaft 26 are identical in construction so that the bearing assembly 24 positioned at one end 25 of the shaft 26 will be described.

Figure 3:
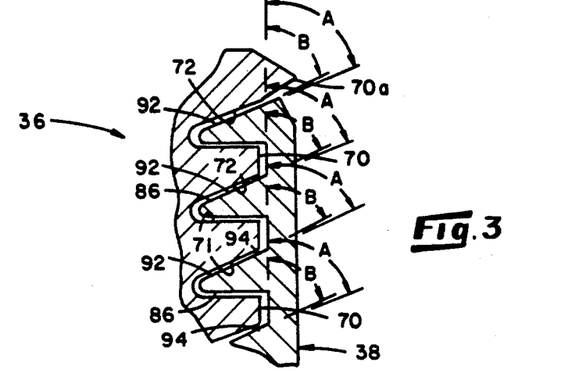
FIG. 3 is a view of a portion of the FIG. 2 cross section drawn to a slightly larger scale.

With reference to FIGS. 2 and 3, the bearing assembly 24 includes means defining a housing 36 to which the roller tube 30 is swaged, an end cover 38 positioned about the shaft 26 and a bearing assembly 40 interposed between the housing 36 and end cover 38 so as to accommodate rotation of the housing 36 and roller tube 30 relative to the end cover 38 and shaft 26. As will be explained in greater detail, the construction of the end cover 38 and housing 36 provide the bearing 40 with an enhanced degree of protection from dirt or other contaminants which may come into contact with the bearing assembly 24 and prevents movement of the assembly components axially of the shaft 26.

The housing 36 is preferably constructed of a hard plastic material, such as a suitable Nylon®, and includes a substantially cylindrical periphery 44 about which the inner wall of the roller tube 30 is swaged and a central opening 48 arranged about the shaft 26 adjacent end 25, and a wall portion 49 extending between the periphery 44 and opening 48. To facilitate the swaging of the tube 30 against the housing periphery 44, a deep groove 42 is defined inwardly of the periphery 44 and opening 48. The groove 42 accommodates an inward collapsing of the outer annulus of the housing 36 as the tube 30 is swaged against the housing periphery 44. For accurately positioning the bearing assembly 24 within the tube 30 prior to the swaging operation, the housing 36 includes an abutment flange 52 located to one side of the periphery 44. As best shown in FIG. 2, the housing 36 is positioned within the tube 30 so that the flange 52 abuts one end of the tube 30.

As shown in FIG. 2, the central opening 48 tightly encircles the bearing 40 and is shaped so as to prevent axial movement of the housing 36 relative to the bearing 40. In this connection, the opening 48 includes a recess 56 proportioned so that the bearing 40 is tightly received thereby, and the housing 36 defines, in the central opening 48, an inwardly-directed annular portion 58 and an annular ridge 62 positioned on opposite sides of the bearing 40. When positioning the bearing 40 within the housing 38 during assembly, the bearing 40 is inserted sidewise within the central opening 48 through the reduced opening defined by the annular ridge 62. Accordingly, the ridge 62 is adapted to flex to a degree necessary to accommodate the forced movement of the bearing 40 through the opening defined by the ridge 62.

Each of the annular portion 58 and ridge 62 define surfaces which abut a corresponding side of the bearing 40 for preventing axial movement of the housing 36 relative to the bearing 40. Therefore, the bearing 40 is held in a stationary condition relative to the housing 36 while the housing 36 is rotated, and the annular portion 58 and ridge 62 are advantageous in this respect. Although the annular ridge 62 is shown in the assembly 24 as extending continuously about the central opening 48, a bearing abutment surface comparable to that provided by the ridge 62 may be provided by a series of tabs arranged along an annular path within the housing central opening as is illustrated by the tabs 314 of the housing 312 of FIGS. 13 and 14.

The wall portion 49 of the housing 36 includes an inner side 66 arranged generally in a radial plane of the housing 36 so as to span the region between the periphery 44 and central opening 48. In order to strengthen the wall portion 49, a plurality of radially extending webs 68 are provided on the inner side 66.

The outer side of the wall 49 cooperates with the end cover 38 so as to define a labyrinth passageway 88 which permits relative rotation between the wall portion 49 and end cover 38 and which inhibits the passage of dirt and other contaminants which may come into contact with the bearing assembly 24. Such labyrinth passageways are common in bearing assemblies of this class, and an example of another labyrinth is shown and described in U.S. Pat. No. 4,458,957.

In the illustrated embodiment 24 and as best shown in FIG. 2, the housing 36 includes a series of concentrically-arranged annular projections 70 defined on the outer side of the wall portion 49 accepted by corresponding grooves defined in the end cover 38. With the exception of the outermost projection 70a and innermost projection 70b, each projection 70 is identical in cross-sectional shape and with its adjacent projection defines a groove 71 having a generally V-shaped cross section. One wall 72 of each of the grooves 71 is preferably a generally inwardly-directed frusto-conically shaped surface 72. As will be described, the grooves 71 of the wall portion 49 are adapted to accept corresponding tongues defined in the end cover 38.

With reference to FIGS. 2-4, the end cover 38 includes a disc portion 82 positioned adjacent the outer side of the wall portion 49, in which the annular projections 70 are defined, and a shaft-receiving hub portion 84 located centrally of the disc portion 82. Like the housing 36, the end cover 38 is constructed of a hard plastic material, such as a Nylon ®.

The inner face of disc portion 82 includes a series of concentrically-spaced annular tongues 86 (FIGS. 2 and 4) which are received by the grooves 71 defined by the housing projections 70 so as to interfit and form with the projections 70 a labyrinth passageway 88. As shown in FIG. 2, the labyrinth passageway 88 extends radially across the housing 36 from the central opening 48 defined therein to an entryway, indicated 89, adjacent the housing periphery 44. The labyrinth passageway 88 provides a tortuous path along which dirt, liquids or other undesirable contaminants must travel in order to reach the bearing 40, and it is the provision of such a tortuous path which inhibits movement of contaminants to the bearing 40 from the entryway 89. As illustrated, each tongue 86 of the end cover 38 includes a radial outwardly-facing frusto-conical surface 92 which is positioned so as to oppose the inwardly-facing surface 72 in the housing 36.

Preferably, as shown in FIGS. 2 and 3, the labyrinth passageway 88 includes changes in cross section to impede movement of contaminants toward the bearing 40. In this connection, the inwardly-facing surface 72 of each housing projection 70 and the opposing outwardly-facing surface 92 of an adjacent tongue 86 converge toward one another as a path is traced generally radially outwardly through the labyrinth passageway 88. As best seen in FIG. 3, each pair of opposing surfaces 72 and 92 converge to a relatively small annular opening 94 adjacent the root of tongues 86. This provides a series of restrictions 94 which impede movement of contaminants through the passageway 88, and thus enhances the capacity of the bearing assembly 24 to protect the bearing 40 from contaminants.

In the depicted embodiment 24 and by way of example, the inwardly-facing surface 72 of each housing projection 70 is sloped at an angle, indicated A in FIG. 3, relative to a radial plane of the housing 36 of about sixty degrees. By comparison, the tongue outwardly-facing surface 92 is sloped at an angle, indicated B, relative to a radial plane of the housing 36 of about fifty-eight degrees. Hence, the surfaces 72 and 92 converge toward its corresponding annular opening 94 at about a two degree slope differential.

The bearing assembly 24 is believed to provide a further advantage in that contaminants which may enter the passageway 88 and contact the passageway surfaces 72 are centrifugally urged away from the bearing 40 during relative rotation between the housing 36 and end cover 38. More specifically and because the frusto-conical surfaces 72 of the housing wall portion 49 are sloped generally outwardly from the axis of housing rotation as a path is traced radially outwardly along the labyrinth passageway 88, contaminants which may contact the surfaces 72 are biased outwardly along the passageway 88 by centrifugal forces generated during the rotation of the housing 36 relative to the end cover 38.

Figure 15:
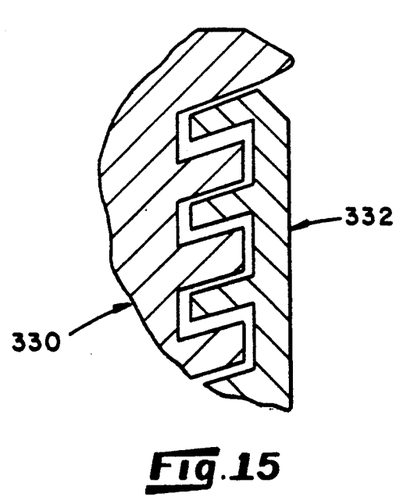
FIG. 15 is a view similar to that of FIG. 3 illustrating one more embodiment.
Figure 16:
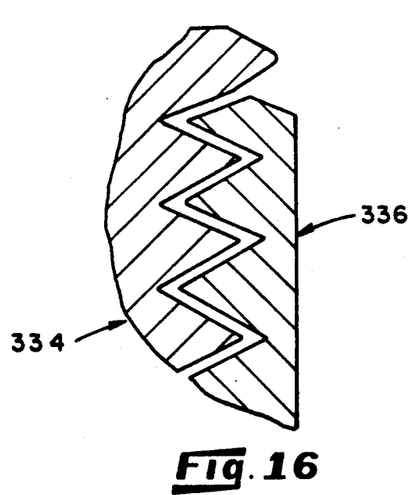
FIG. 16 is a view similar to that of FIG. 3 illustrating still one more embodiment.

It will be understood that for purposes of centrifugally urging contaminants in the manner described, the sloped surfaces of the labyrinth passageway of a bearing assembly may be provided by housing wall portions and end covers of various shapes. For example, each of the housing 312 and end cover 322 of FIG. 13, the housing 330 and end cover 332 of FIG. 15 and the housing 334 and end cover 336 of FIG. 16 provide a radially-extending labyrinth passageway having outwardly-sloped surfaces which when rotated centrifugally urge contaminants which contact the surfaces radially outwardly and hence away from the bearing of the assembly. It will be noted that the entire labyrinth surface provided by the housing 334 of FIG. 16 is sloped outwardly as a path is traced outwardly along the passageway. Therefore, contaminants contacting the labyrinth surface of the housing 334 can be centrifugally moved outwardly by the housing 334 for the full length of the passageway. However, for most effective centrifugal urging of contaminants along the sloped surfaces of the bearing assembly housing during rotation of the housing, the aforedescribed sloping of the housing surfaces 72 of the assembly 24 of FIGS. 2-4 is preferred.

With reference again to FIG. 2, the hub portion 84 of the end cover 38 is tightly positioned between the inner surface of the bearing 40 and the surface of the shaft 26. For facilitating assembly of the bearing assembly 24, the hub portion 40 includes a plurality of fingers 100 extending axially from the end cover 38, each finger 100 terminating in a flange 108. When inserting the hub portion 84 through the bearing 40, the spacing defined between the fingers 100 accommodate an inward flexing of the fingers 100 so that the flanges 108 pass through the opening of the bearing 40, and the flanges 108 provide an abutment surface against which one side of the bearing 40 is positioned.

For purposes of preventing contaminants from entering the bearing assembly 24 along the shaft 26 from the end 25 thereof, the end cover 38 includes means defining a closure 110 for completely covering the shaft end 25. In the depicted assembly 24, the closure 110 is cup-like in form defining a cylindrical inner wall which is a continuous extension of the inner surface of the hub portion 84 and defining a substantially flat end portion 114. The shaft end 25 is supported in the cup-like extension. Unlike many conventional bearing assemblies having an open end through which the fixed shaft extends, the closure 110 seals off the shaft end 25 and thereby prohibits movement or migration of contaminants along the length of the shaft 26 between the hub portion 84 and the shaft surface. Moreover, since the closure 110 is molded integrally with the disc portion 82 and hub portion 84 and spans what would otherwise be an opening in the hub portion 84, the closure 110 enhances the rigidity of the end cover 38. In addition, the shaft end 25 abuts the end portion L14 of the closure 110, the shaft 26 is prevented from moving axially with respect to the end cover 38 in the direction of the closure 110.

The outer surface 115 of the end cover closure 110 is preferably irregular in cross-section so as to prevent rotation of the end cover 38 in the frame 25. In this connection, the frame 27 includes a plate member 116 attached to the frame support post 28 having a hexagonal opening 118 for receiving the closure 110, which is also of hexagonal shape as illustrated. Thus, the closure 110 is restrained from rotating relative to the frame. It will be understood that the plate member 116 is detachable from the support post to facilitate mounting of the bearing assembly 24 upon the frame 25.

Figure 13:
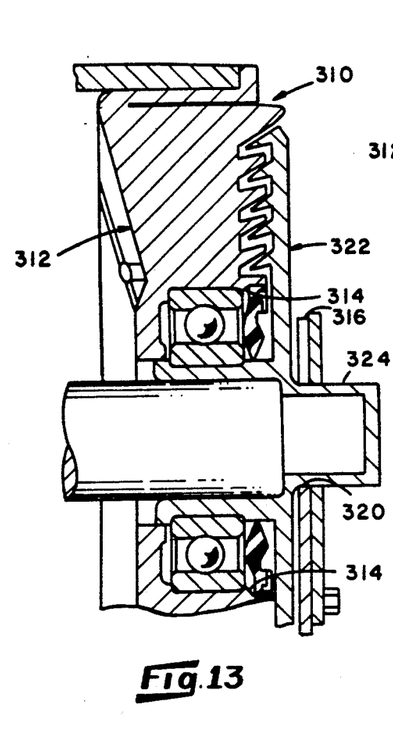
FIG. 13 is a view similar to that of FIG. 2 illustrating a still further embodiment.
Figure 14:
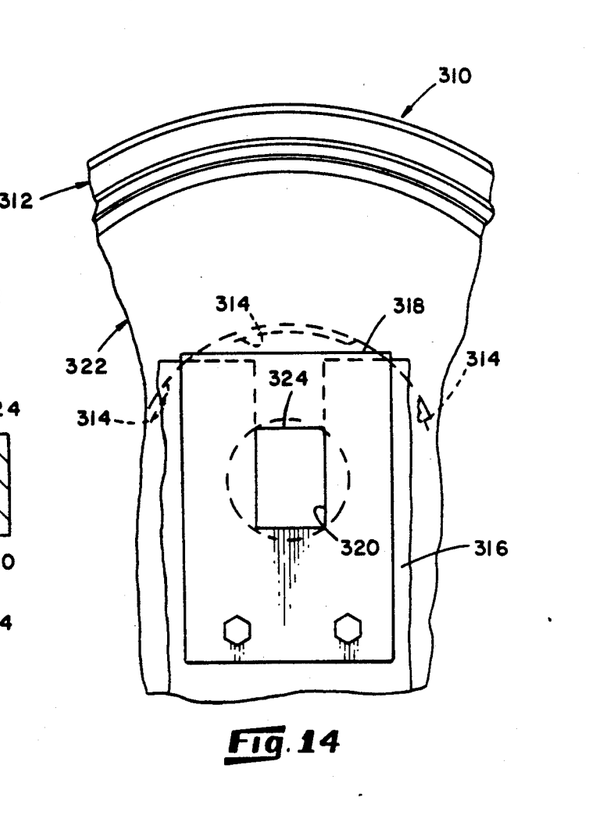
FIG. 14 is an end elevational view of the FIG. 13 assembly as seen generally from the right in FIG. 13.

Instead of the hexagonal shape of the closure 110, an end cover closure may possess an alterative shape. For example, there is illustrated in FIGS. 13 and 14 a bearing assembly 310 having an end cover closure 324 which is rectangular in shape. The depicted assembly 310 is supported in a frame 316 having an upwardly-opening cutout 320 within which the closure 324 is nested and a plate member 318 having a rectangular cutout for accepting the closure 324.

As shown in FIG. 2, a resilient annular seal 126 is positioned within the bearing cavity 106 for enhancing the protection of the bearing 40 from any contaminants which may enter the assembly 24 through the labyrinth passageway 88. The seal 126 includes a rubberized body portion 128 within which a reinforcing metal insert 130 is embedded and a radially inwardly-directed lip portion 132 joined to the body portion 128. When positioned within the bearing cavity 106 as shown in FIG. 2, the seal body portion 128 is positioned against the inwardly-facing surface of the housing opening 48 and the lip portion 132 is positioned against the outer surface of the hub portion 84.

Figure 5:
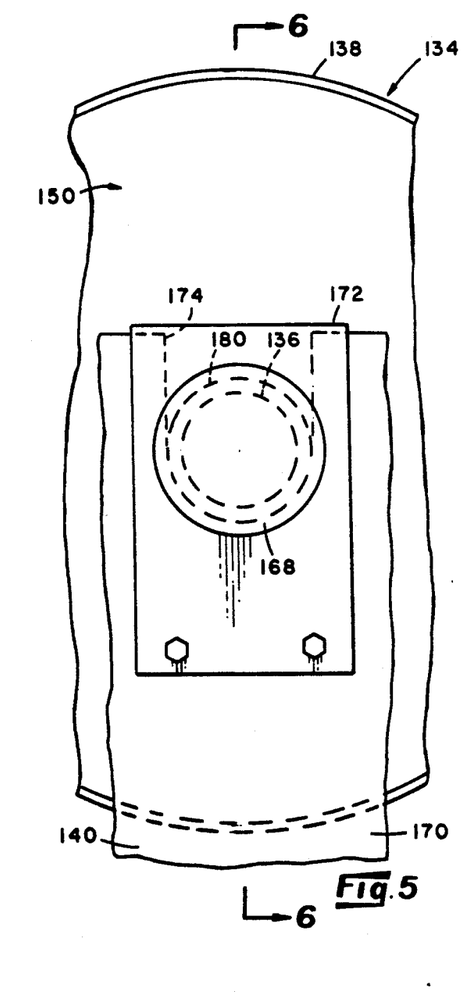
FIG. 5 is a view similar to that of FIG. 4 illustrating an alternative embodiment of the bearing assembly.
Figure 6:
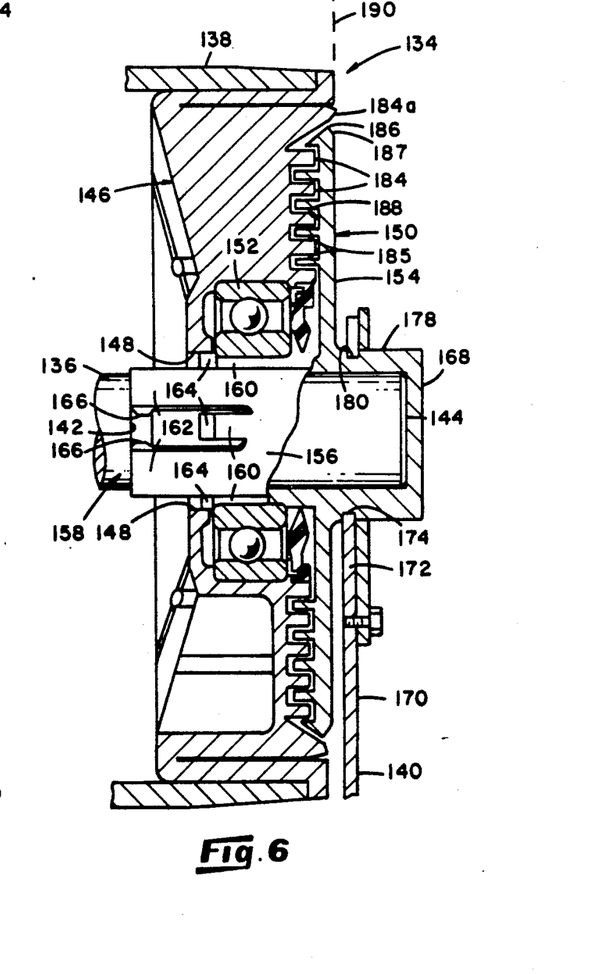
FIG. 6 is a fragmentary cross-sectional view taken about on line 6—6 of FIG. 5.

With reference to FIGS. 5 and 6, there is shown another embodiment of the bearing assembly, generally indicated 134, shown interposed between a grooved shaft 136 and a roller tube 138. As best shown in FIG. 6, both the shaft 136 and bearing assembly 134 are supported by a frame 140, and the shaft 136 is provided with an annular groove 142 in its outer surface. The groove 142 is spaced from the end of the shaft 136. The bearing assembly 134 includes a housing 146 having a central opening 148 arranged about the shaft 136, an end cover 150 positioned about the shaft 136, and a bearing assembly 152 accommodating the rotation of the housing 146 relative to the end cover 150. The end cover 150 includes a disc portion 154 positioned adjacent the side of the housing 146 corresponding with the shaft end 144 and a hub portion 156 positioned about the shaft 136.

As best shown in FIG. 6, the hub portion 156 includes means, generally indicated 158, for cooperating with the shaft groove 142 and limiting axial movement of the end cover 150 relative to and along the length of the shaft 136. In this connection, the hub portion 156 includes two sets of axially-extending fingers 160 and 162 alternately arranged about the shaft 136. One set of fingers 160 include radially outwardly-extending flanges 164 positioned against the inner side of the inner ring of the bearing 152. The other set of fingers 162 each include a radially inwardly-directed tab 166 proportioned to be snugly received by the opposing walls of the shaft groove 142 when positioned therein. Thus, when the tabs 166 are engaged in the shaft groove 142, the end cover 150 and the housing 146 are securely locked in position along the length of the shaft 136.

The end cover 150 of FIGS. 5 and 6 also includes a closure 168 formed in the hub portion 156 for completely covering the shaft end 144 and which is received by the frame 140 for mounting the bearing assembly 134 on the frame 140. In this connection, the frame 140 includes a support post 170 having an upwardly-opening U-shaped cutout 174 for receiving the closure 168 and a support plate 172 having a circular closure-receiving opening. The closure 168 has a cylindrical outer surface 178 which includes an annular groove 180 which is proportioned to interfit with the post cutout 174. As a result, the end cover 136 is prevented from moving axially relative to the frame 140.

As shown in FIG. 6, the housing 146 includes an outer face defining a series of concentrically-arranged annular projections 184 for defining a labyrinth passageway 188 with mating projections 185 on the disc portion 154 of the end cover 150. The passageway 188 includes an outer entryway 186, and the outermost lip 184a terminates in a radial plane 190 of the assembly 134. As best shown in FIG. 6, the passageway entryway 186 is recessed from the radial plane 190 so that the lip 184a provides an umbrella over the entryway 186. In other words, the extension of the lip 184a to one side of the entryway 186 prevents contaminants which may fall off the end of the lip 184a from falling into the entryway 186. Moreover, the sloped shape of the surfaces of the lip 184a are believed to enhance the centrifugal urging of contaminants away from the entryway 186 while the housing 146 is rotated. In addition and as shown in FIG. 6, the periphery of the end cover 150 adjacent the entryway 186 provides a surface 187 sloped generally inwardly from the entryway 186. Therefore, contaminants which fall from the end of the lip 184a and upon the sloped surface 187 of the end cover 150 are deflected away from, rather than toward, the entryway 186.

Figure 7:
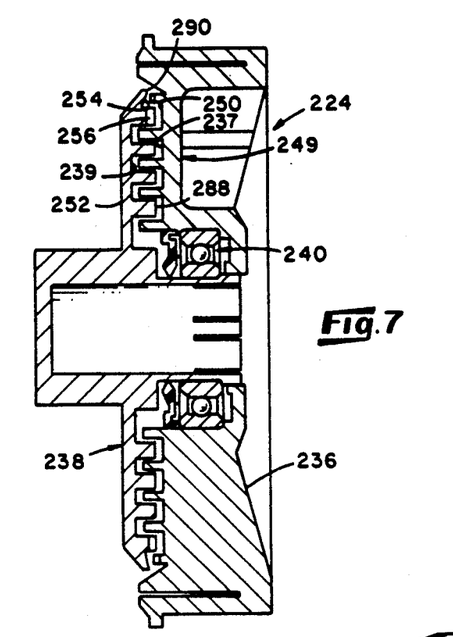
FIG. 7 is a transverse cross-sectional view of still another embodiment of the bearing assembly.
Figure 8:
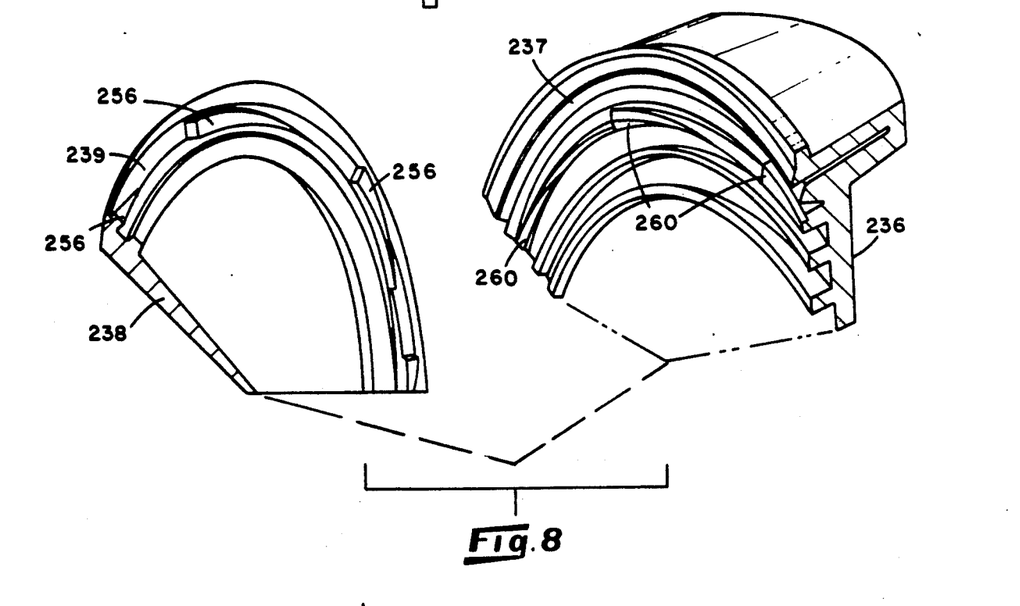
FIG. 8 is a fragmentary, exploded perspective view of a portion of the FIG. 7 embodiment.
Figure 9:
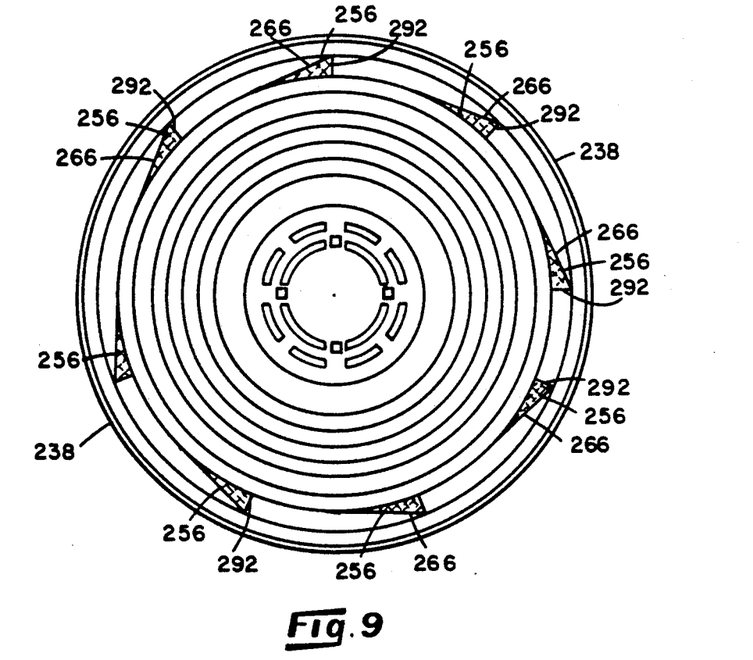
FIG. 9 is a fragmentary side elevational view of the end cap of the FIG. 7 assembly.
Figure 10:
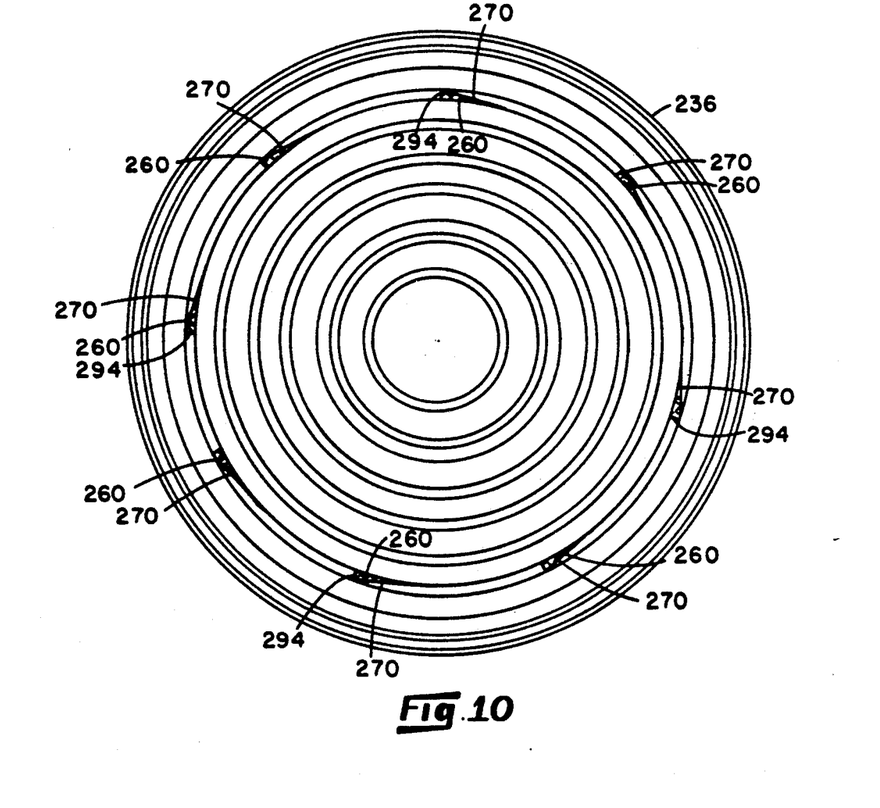
FIG. 10 is a fragmentary side elevational view of the housing of the FIG. 7 assembly.

With reference to FIGS. 7-10, there is illustrated still another embodiment of a bearing assembly, generally indicated as 224. The bearing assembly 224 includes a housing 236 having a periphery about which a roller tube is positionable, an end cover 238 positionable about a stationary shaft and a ball bearing assembly 240 disposed between the housing 236 and end cover 238 for permitting rotation of the housing 236 about the end cover 238. The housing 236 includes a wall portion 249 extending inwardly of the housing periphery, and the end cover 238 includes a disc portion 252 positioned adjacent one side of the wall portion 249 as shown in FIG. 7. The wall portion 249 and disc portion 252 define side surfaces 237 and 239, respectively, which face one another and which include a plurality of interfitting annuli which collectively define a labyrinth passageway 288 extending generally radially through the assembly 224 between the disc portion 252 and wall portion 249. More specifically, the labyrinth passageway 288 extends generally radially inwardly from a passageway entryway 290 to the central opening of the housing 236 within which the bearing 240 is positioned.

Means are provided for centrifugally expelling contaminants which may enter the entryway 290 from the labyrinth passageway 288. In this connection and with reference to FIGS. 7 and 8, the disc portion 252 of the end cover 238 includes means defining a plurality of projections 256 arranged along an annular path on the side surface 239 and which are received in an annular groove 250 in the side surface 237 of the wall portion 249. The wall portion 49 also includes a plurality of projections 260 arranged along an annular path on the wall portion side surface 237 and which are received by an annular groove 254 defined in the disc portion side surface 239 adjacent and outboard of the projections 256. Each of the projections 256 and 260 (which have been cross-hatched in FIGS. 9 and 10 for purposes of understanding) defines a ramp-like surface 266 or 270, respectively, which faces generally outwardly. The opposite ends of the projections 256 and 260 are located at different distances as measured from the axis of housing rotation so that each surface 266 or 270 is sloped with respect to the annular path in which the projections are located. The end of each ramp-like surface 266 or 270 positioned farthest from the rotational axis of the housing 236 terminates in a planar surface 292 or 294 oriented in a plane containing the housing rotational axis.

It follows from the foregoing that during rotation of the housing 236 relative to the end cover 238, the housing projections 260 rotate or spin within the groove 254 of the end cover 238. As a result of rotation, the ramp-like surfaces 270 of the projections 260 expel contaminants which may move through the entryway 290 and into contact with the surfaces 270. More specifically, contaminants which move into the labyrinth passageway 288 and come into contact with the ramp-like surfaces 270 of the projections 260 are driven radially outwardly by centrifugal force through the entryway 290 of the labyrinth passageway 288.

For most effective expulsion of the contaminants, it is preferred that the ramp-like surfaces 270 be sloped so that the ends thereof positioned closest to the axis of housing rotation correspond with the direction in which the housing 236 is rotated. In the depicted housing 236, one-half of the projections 260 illustrated in FIG. 10 (i.e., four of a total of eight shown) each define a ramp-like surface 270 whose end positioned closer to the axis of housing rotation is directed generally counterclockwise of the housing 236 while the remaining one-half of the projections 260 illustrated each define a ramp-like surface 270 whose end positioned closer to the axis of housing rotation is directed generally clockwise of the housing 236. Therefore, whether the housing 236 is rotated in a clockwise direction or a counterclockwise direction, one-half of the projections 260 are sloped so as to provide the most effective expulsion of contaminants which come into contact with their surfaces 270.

Figure 11:
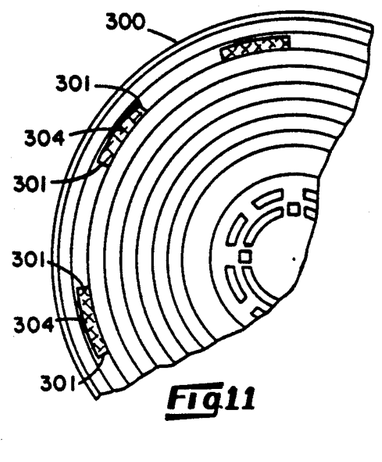
FIG. 11 is a fragmentary view similar to that of FIG. 9 illustrating an end cover of a further embodiment.
Figure 12:
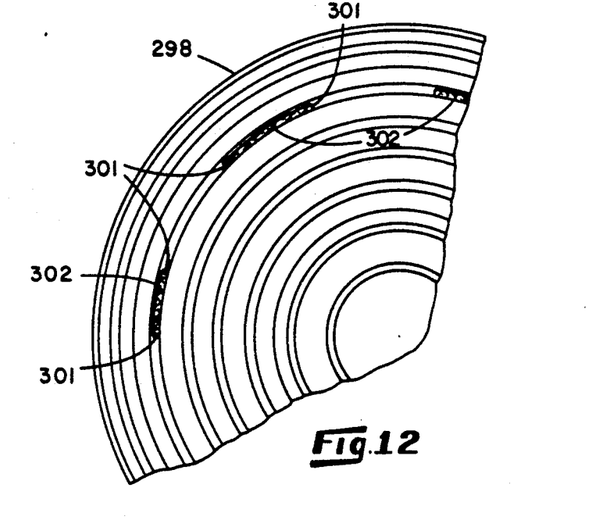
FIG. 12 is a fragmentary view similar to that of FIG. 10 illustrating a housing of a further embodiment.

As an alternative to the sloped projections 256 and 260 of the bearing assembly 224 of FIGS. 7-10, there is illustrated in FIGS. 11 and 12 an end cover 300 and a housing 298, respectively, of a bearing assembly having housing projections 304 and cover projections 302 of alternative configurations. More specifically, the projections 302 of the housing 298 and the projections 304 of the cover 300 have planar ends 301 which extend generally radially from the axis of rotation of the housing. While the ramp projections 256 and 260 of FIGS. 7-10 tend to drive out contaminants, the ends 301 of the projections 302 and 304 accelerate any contaminants in a circular path from which they are expelled by centrifugal force.

It follows that the present invention accomplishes its intended objects. In particular, the bearing of the assembly is protected from contaminants by the closure of the end cover which covers the end of the shaft upon which the assembly is mounted, by the converging surfaces of the labyrinth passageway defined between the housing and end cover, and by the outermost lip of the housing which umbrellas the entryway of the labyrinth passageway. Contaminants which come into contact with surfaces of the labyrinth passageway or projections which are provided therein are centrifugally accelerated radially outwardly through the passageway as the housing is rotated. Moreover, the bearing assembly is prevented from moving axially relative to the shaft and frame by the abutting engagement between the end cover closure and shaft end, by end cover tabs received by a cooperating groove in the shaft, and by the shape of the end cover closure with respect to a closure-receiving opening defined in the frame. The bearing assembly components are prevented from moving axially with respect to one another by means of opposing bearing abutment surfaces provided by the housing and positioned on opposite sides of the bearing.

It will be understood that numerous substitutions and modifications can be had to the aforedescribed embodiments without departing from the spirit of the invention. Accordingly, the aforedescribed embodiments are intended for purposes of illustration and not as limitation.

What is claimed is:

1. A bearing assembly for rotatably supporting a roller tube of a conveyor about an end of a fixed shaft wherein the fixed shaft terminates in an end surface which intersects the longitudinal axis of the shaft, said assembly comprising: a housing defining a central opening arrangeable about a fixed shaft and adjacent an end thereof and a periphery about which a conveyor roller tube is positionable for rotation with the housing about the fixed shaft;

an end cover including a disc portion positioned adjacent the side of the housing which is disposed adjacent the end surface of the fixed shaft and a shaft-receiving hub portion joined to the disc portion and positionable about the shaft in a stationary condition therewith; and a bearing positioned within the central opening of the housing and about the shaft for accommodating rotation of the housing about the shaft and relative to the end cover;

said end cover further including a closure portion, associated with the hub portion for spanning so as to cover the end surface of the shaft when the end cover is operatively positioned about the shaft end, said closure portion defining a solid surface for spanning the shaft end surface to prevent the migration of contaminants between the end cover and the shaft from the shaft end surface.

2. The assembly as defined in claim 1 wherein said closure portion is integrally joined in to the disc portion of the end cover to enhance the structural rigidity of the end cover.

3. The assembly as defined in claim 1 wherein said closure portion includes an abutment surface for abutting the end surface of the shaft when the end cover is positioned about the shaft end to thereby limit the axial movement of the shaft relative to the end cover.

4. The assembly as defined in claim 1 wherein the fixed shaft is supportable by a frame having a shaft-receiving opening of non-circular configuration, and said closure portion defines an outer surface positionable within the shaft-receiving opening and having a configuration shaped with respect to the non-circular configuration thereof so that when the closure portion is positioned within the shaft-receiving opening, the end cover is prevented from rotating relative to the frame.

5. A combination for rotatably supporting a roller tube of a conveyor comprising:
   a frame;
   a shaft having two opposite ends and supported by the frame at the shaft ends, at least one of the shaft ends terminating in an end surface which intersects the longitudinal axis of the shaft; and
   a bearing assembly associated with said one end of the shaft for rotatably supporting the roller tube about said one shaft end, said assembly including a housing having a central opening arranged about the shaft adjacent said one end and defining a periphery about which the roller tube is positionable for rotation with the housing, an end cover having a disc portion positioned adjacent the side of the housing which is disposed adjacent said one shaft end and including a shaft-receiving hub positioned about the shaft in a stationary condition with respect thereto, and a bearing positioned within the central opening and about the shaft permitting rotation of the housing relative to the shaft and end cover;
   said frame defining a shaft-receiving opening having an interior of a non-circular configuration; and
   said end cover of said bearing assembly includes a closure portion associated with the end cover hub which spans so as to cover the end surface of the shaft and received by said shaft-receiving opening, said closure portion defining an outer surface which is shaped with respect to the interior of the shaft-receiving opening so that said closure portion is prevented from rotating relative to the frame.

6. A bearing assembly for rotatably supporting a roller tube of a conveyor about a fixed shaft comprising:

a housing defining a central opening arrangeable about a fixed shaft and a periphery about which a roller tube is positionable for rotation with the housing about the fixed shaft and including a wall portion joining the central opening and the periphery;

an end cover having a disc portion positioned adjacent one side of said wall portion and a shaft-receiving hub portion joined to the disc portion and being positionable about the shaft in a stationary condition therewith; and a bearing positioned generally within the central opening of the housing and about the shaft for permitting rotation of the housing relative to the shaft and end cover;

said wall portion and said disc portion including side surfaces which generally face one another and which include a plurality of interfitting and concentrically-arranged annuli defining a labyrinth passageway extending generally radially across said wall portion side surface from an inner location adjacent the bearing to an outer entryway adjacent the housing periphery;

two adjacent and concentric annuli of said housing wall portion defining a grove therebetween and the outermost annulus of said two adjacent annuli defining an inwardly-facing surface providing one wall of said groove; and one annulus of said disc portion is received by said wall portion groove and defines an outwardly-facing surface positioned in a spaced relationship with said inwardly-facing surface of said outermost wall portion annulus so as to generally oppose said inwardly-facing surface, said inwardly-facing and outwardly-facing surfaces being arranged in such a relationship so as to converge toward one another as a path is traced generally radially outwardly through said labyrinth passageway between said inwardly-facing and outwardly-facing surfaces so that the opposing surfaces converge to a relatively small annular opening providing an impedance to the migration contaminants moving radially inwardly through said labyrinth passageway toward the space provided between said inwardly-facing and outwardly-facing surfaces.

7. The assembly as defined in claim 6 wherein said inwardly-facing and outwardly-facing surfaces collectively define the outer entryway of said labyrinth passageway.

8. A bearing assembly for rotatably supporting a roller tube of a conveyor about fixed shaft comprising:

a housing defining a central opening arrangeable about a fixed shaft and a periphery about which a roller tube is positionable for rotation with the housing about the fixed shaft and including a wall portion joining the central opening means and the periphery;

an end cover having a disc portion positioned adjacent one side of the wall portion and a shaft-receiving hub portion joined to the disc portion and being positionable about the shaft in a stationary condition therewith; and a bearing positioned generally within the central opening of said housing and about the shaft for accommodating rotation of the housing relative to the shaft and end cover;

said wall portion defining a side surface corresponding with said one side of said housing and defining a series of concentrically-arranged annular grooves centered about the shaft, each of said annular grooves including one wall which faces generally radially-inwardly of said assembly;

a disc portion defines a series of annular and concentrically-arranged tongues which are received by said annular grooves so as to define with the grooves a labyrinth passageway extending radially across said wall portion side surface from an inner location adjacent the bearing to an outer entryway adjacent the housing periphery, each tongue defining an outermost side surface which is spaced from said one wall of its corresponding groove so as to generally oppose said one wall and which generally converges toward said one wall as a path is traced generally radially outwardly through the labyrinth passageway between the outermost side surface and said one groove wall so that a small annular opening is provided at the outermost entrance to the spacing provided between each outermost side surface of the tongue and its corresponding groove wall so that a series of relatively small annular openings are provided along said labyrinth passageway for impeding the progress of contaminants moving radially inwardly through the passageway.

9. A bearing assembly for rotatably supporting a roller tube of a conveyor roller about a fixed shaft comprising;

a housing defining a central opening arrangeable about a fixed shaft and periphery about which a roller tube is positionable for rotation with the housing about the fixed shaft and including a wall portion joining the central opening-defining and the periphery;

an end cover having a disc portion positioned adjacent one side of the wall portion and a shaft-receiving hub portion joined to the disc portion and being positionable about the shaft in a stationary condition therewith; and a bearing positioned generally within the central opening of said housing and about the shaft for permitting rotation of the housing relative to the shaft and end cover;

said wall portion and said disc portion defining side surfaces which generally face one another and which include a plurality of interfitting and concentrically-arranged annuli which collectively defines a labyrinth passageway extending generally radially inwardly of the assembly between the wall portion and the disc portion from a passageway outer entryway located adjacent the housing periphery to an inner location adjacent the bearing;

said housing including an annular lip portion disposed radially outwardly of so as to cover said passageway entryway so that contaminants which fall from the end of the lip portion are not directed into said passageway entryway, said annular lip portion terminated in a preselected radial plane of said assembly, said passageway entryway is recessed from said preselected radial plane, said lip portion including sloped surface which extends generally from the passageway entryway to the preselected radial plane and said sloped surface is sloped radially outwardly from a location adjacent the passageway entryway at an appreciable angle in relation to the axis of the fixed shaft so that contaminants which contact said sloped surface are centrifugally urged away from the passageway entryway as the housing is rotated about the shaft.

10. The assembly of claim 9 wherein said end cover defines a peripheral edge surface adjacent said passageway entryway and sloped generally radially inwardly away from said entryway and said preselected radial plane intersects said sloped edge surface.

* * * * *

UNITED STATES PATENT AND TRADEMARK OFFICE
CERTIFICATE OF CORRECTION

PATENT NO. : 5,025,917

DATED : June 25, 1991

INVENTOR(S) : Ian Smith, Carmin C. Simerly, Jim E. Hilty and Mark S. Byerley It is certified that error appears in the above-identified patent and that said Letters Patent is hereby corrected as shown below:

Column 5, line 33, delete "L14" and insert --114-- therefor.

Column 6, line 16, after "portion" delete hyphen.

Column 10, Claim 6, line 25, delete "grove" and insert --groove-- therefor.

Column 11, Claim 8, line 5, before "disc" delete "a" and insert --said-- therefor.

Column 12, Claim 9, line 21, delete "terminated" and insert --terminates-- therefor.

Signed and Sealed this

First Day of December, 1992

*Attest:*

DOUGLAS B. COMER

*Attesting Officer*   *Acting Commissioner of Patents and Trademarks*